(12) United States Patent
Reid et al.

(10) Patent No.: US 9,758,040 B1
(45) Date of Patent: Sep. 12, 2017

(54) PRIME MOVER RPM LIMITING CONTROL

(71) Applicant: Textron Inc., Providence, RI (US)

(72) Inventors: Shane Christopher Reid, Martinez, GA (US); John Lawrence Stocks, Graniteville, SC (US); Matthew Lawrence O'Donnell, North Augusta, SC (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 15/217,166

(22) Filed: Jul. 22, 2016

(51) Int. Cl.
| | | |
|---|---|---|
| *B60K 28/00* | (2006.01) | |
| *B60K 28/10* | (2006.01) | |
| *F02D 41/02* | (2006.01) | |
| *F02D 41/26* | (2006.01) | |

(52) U.S. Cl.
CPC ............ *B60K 28/10* (2013.01); *F02D 41/021* (2013.01); *F02D 41/26* (2013.01)

(58) Field of Classification Search
CPC ................................ B60K 28/10; B60K 28/00
See application file for complete search history.

(56) References Cited

U.S. PATENT DOCUMENTS

| | | | |
|---|---|---|---|
| 3,226,674 A | 12/1965 | Eriksson | |
| 3,401,765 A | 9/1968 | Hagon | |
| 3,787,804 A | 1/1974 | MacDonald | |
| 3,864,668 A | 2/1975 | Bickford | |
| 4,102,426 A | 7/1978 | Walden | |
| 4,319,658 A | 3/1982 | Collonia et al. | |
| 6,278,358 B1 | 8/2001 | Spoto et al. | |
| 7,005,976 B2 | 2/2006 | Hagenbuch | |
| 7,061,375 B2 | 6/2006 | Koike et al. | |
| 7,446,652 B2 | 11/2008 | Hagenbuch | |
| 7,469,767 B2 * | 12/2008 | Jasem .................... | B60K 28/04 180/170 |
| 7,561,951 B2 | 7/2009 | Rao et al. | |
| 7,686,119 B2 | 3/2010 | Greene | |
| 8,220,579 B2 | 7/2012 | McCoy | |
| 8,464,824 B1 | 6/2013 | Reisenberger | |
| 8,534,397 B2 | 9/2013 | Grajkowski et al. | |
| 8,548,710 B1 | 10/2013 | Reisenberger | |
| 8,781,705 B1 * | 7/2014 | Reisenberger ......... | B60K 28/04 180/268 |
| 2011/0190999 A1 | 8/2011 | Van Houten et al. | |
| 2015/0096819 A1 | 4/2015 | Grajkowski et al. | |

* cited by examiner

*Primary Examiner* — John Walters
*Assistant Examiner* — James Triggs
(74) *Attorney, Agent, or Firm* — Polster Lieder (57) ABSTRACT

A method for controlling the operation of a vehicle prime mover based on the engagement status of one or more safety restraints of the vehicle. In various implementations the method comprises monitoring, via a RPM controller of the vehicle, an operational status of vehicle, monitoring, via the RPM controller, the engagement status at least one passenger safety restraint of the vehicle, and limiting, via the RPM controller, a rotational speed, e.g., revolutions per minute (RPM) of one or more prime mover of the vehicle when the vehicle is in a On operational status and the at least one safety restraint is in a disengaged status.

13 Claims, 6 Drawing Sheets

PRIME MOVER RPM LIMITING CONTROL

FIELD

The present teachings relate to RPM Limiting throttle control, and more particularly to an off-road vehicle including an engine RPM control system for limiting the RPM of the engine while a safety belt is not connected.

BACKGROUND

The statements in this section merely provide background information related to the present disclosure and may not constitute prior art.

Vehicle manufacturers are constantly adding safety features to the vehicles that produce. For example, many manufacturers of light weight vehicles, such maintenance vehicles, cargo vehicles, shuttle vehicles, golf carts, other all-terrain vehicles (ATVs), utility task vehicles (UTVs), recreational off-highway vehicles (ROVs), side-by-side vehicles (SSV), worksite vehicles, buggies, tactical vehicles, etc. have implemented systems that limit the ground speed of the vehicle when a driver's safety restraint (e.g., seat belt) is not properly deployed, e.g., the restraint latch/buckle/connector is not properly engaged or connected. However, implementation of such safety restraint ground speed control systems is undesirably complex and expensive.

SUMMARY

In various embodiments, the present disclosure provides a method for controlling the operation of a vehicle prime mover based on the engagement status of one or more safety restraints of the vehicle. In various implementations the method comprises monitoring, via a RPM controller of the vehicle, an operational status of vehicle, monitoring, via the RPM controller, the engagement status of at least one passenger safety restraint of the vehicle, and limiting, via the RPM controller, a rotational speed, e.g., revolutions per minute (RPM) of one or more prime mover of the vehicle when the vehicle is in an On operational status and the at least one safety restraint is in a disengaged status.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

The apparatuses/systems and methods described herein can be implemented at least in part by one or more computer program products comprising one or more non-transitory, tangible, computer-readable mediums storing computer programs with instructions that may be performed by one or more processors. The computer programs may include processor executable instructions and/or instructions that may be translated or otherwise interpreted by a processor such that the processor may perform the instructions. The computer programs can also include stored data. Non-limiting examples of the non-transitory, tangible, computer readable medium are nonvolatile memory, magnetic storage, and optical storage.

As used herein, the term module can refer to, be part of, or include an application specific integrated circuit (ASIC); an electronic circuit; a combinational logic circuit; a field programmable gate array (FPGA); a processor (shared, dedicated, or group) that performs instructions included in code, including for example, execution of executable code instructions and/or interpretation/translation of uncompiled code; other suitable hardware components that provide the described functionality; or a combination of some or all of the above, such as in a system-on-chip. The term module can include memory (shared, dedicated, or group) that stores code executed by the processor.

The term code, as used herein, can include software, firmware, and/or microcode, and can refer to one or more programs, routines, functions, classes, and/or objects. The term shared, as used herein, means that some or all code from multiple modules can be performed, e.g., executed, using a single (shared) processor. In addition, some or all code from multiple modules can be stored by a single (shared) memory. The term group, as used above, means that some or all code, that can include executable and/or non-executable code, from a single module can be performed, e.g., executable code can be executed using a group of processors. In addition, some or all code from a single module can be stored using a group of memories.

While the present disclosure is primarily directed to an off-road utility vehicle, it should be understood that the features disclosed herein can have application to other types of vehicles such as most lightweight vehicles that are not designated for use on roadways, e.g., maintenance vehicles, cargo vehicles, shuttle vehicles, golf carts, other all-terrain vehicles (ATVs), utility task vehicles (UTVs), recreational off-highway vehicles (ROVs), side-by-side vehicles (SSV), worksite vehicles, buggies, motorcycles, watercraft, snowmobiles, tactical vehicles, etc.

Figure 1:
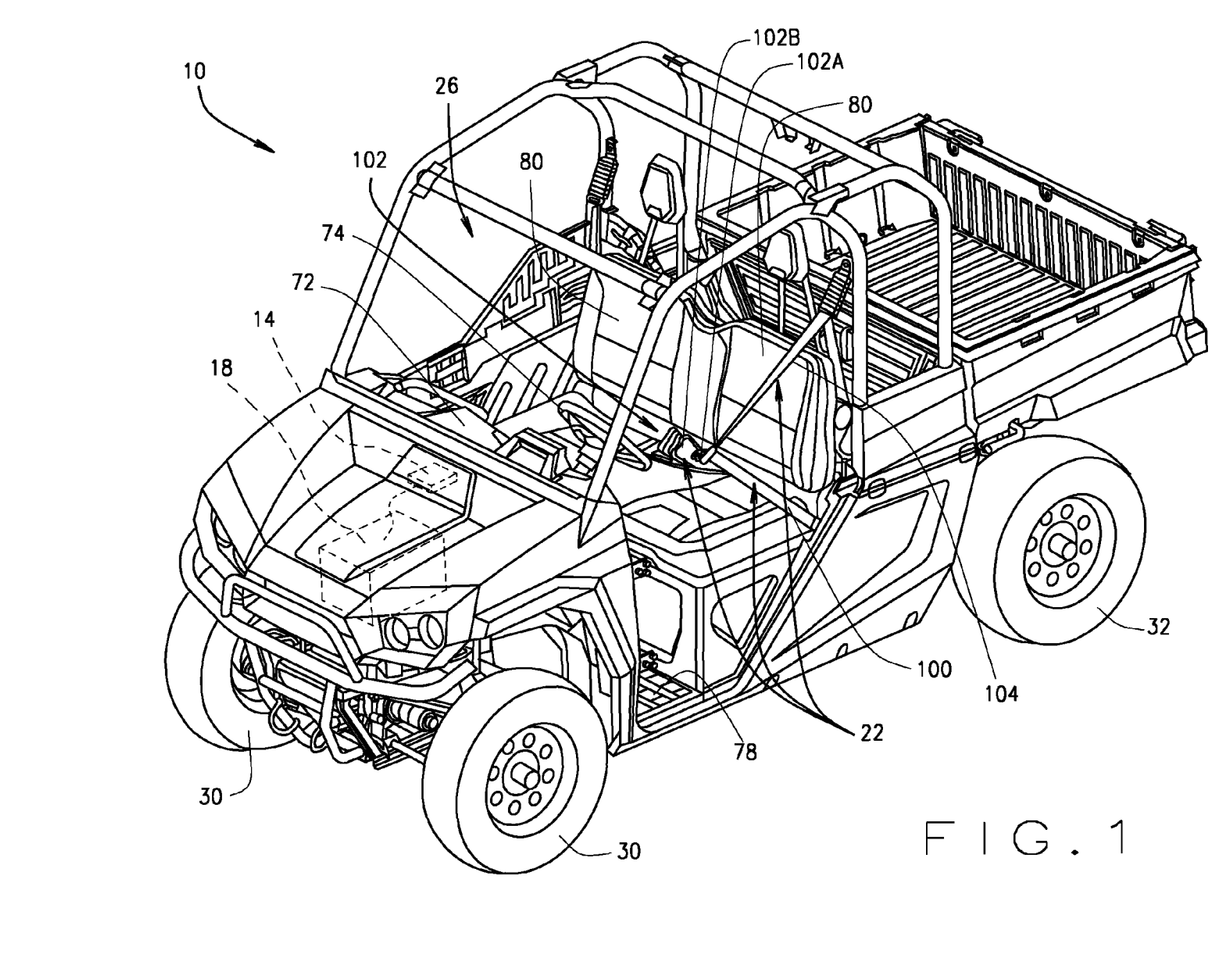
FIG. 1 is an isometric view of a vehicle having a safety restraint prime mover RPM (revolutions per minute) limiting controller, in accordance with various embodiments of the present disclosure.
Figure 2:
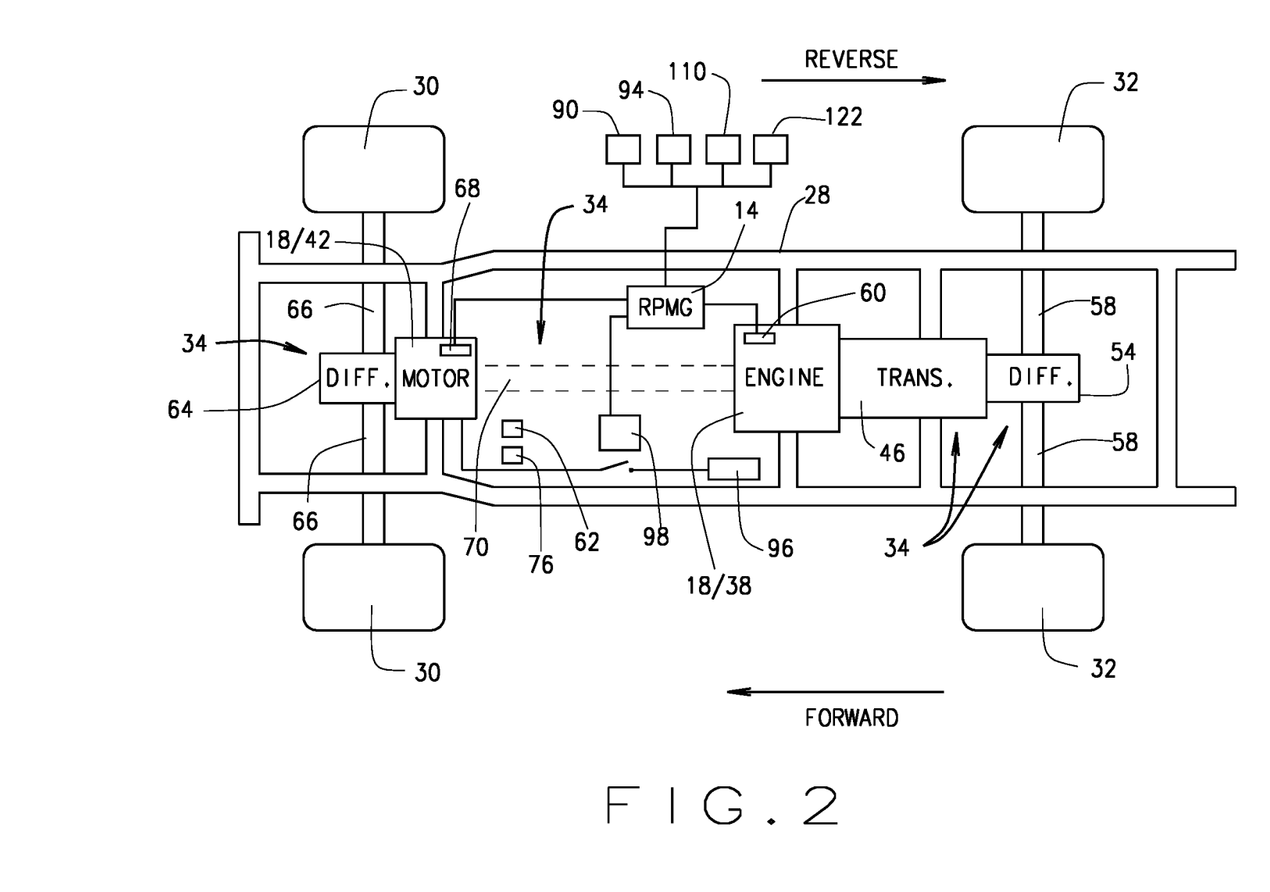
FIG. 2 is a schematic representation of the vehicle shown in FIG. 1, in accordance with various embodiments of the present disclosure.

Referring to FIGS. 1 and 2, the present disclosure provides a utility vehicle 10 that includes a safety restraint prime mover RPM controller 14 that is structured and operable to control (e.g., limit) the rotational speed (e.g., revolutions per minute (RPM)) of at least one vehicle prime mover 18 (e.g., an internal combustion engine (ICE) and/or an electric motor) when one or more safety restraint device 22 (e.g., seat belt(s), side/door net(s), etc.) of the vehicle 10 is/are disengaged (e.g., disconnected or unbuckled) and the vehicle 10 in an On operational status. The safety restraint prime mover RPM controller 14 will be referred to herein simply as the RPM controller 14 and can comprise one or more computer based modules.

The vehicle 10 additionally includes a passenger compartment 26 supported by a chassis 28 of the vehicle 10, one or more front wheels 30 operationally connected to the chassis 28, one or more rear wheels 32 operationally connected to the chassis 28, and a drivetrain 34 operationally connected to at least one of the front and/or rear wheels 30 and/or 32. The drivetrain 34 includes the prime mover(s) 18. As described above, the one or more prime mover 18 (shown in FIG. 1) can be one of, or both of, an internal combustion engine (ICE) 38 and an electric motor 42 (shown in FIG. 2).

In various implementations wherein the vehicle 10 includes the ICE 38, the vehicle drivetrain 34 additionally includes a transmission 46 (e.g., a continuously variable transmission (CVT)) operably connected to the ICE 38 and structured and operable to receive torque (e.g., motive force) generated by the ICE 38. In various embodiments, the transmission 46 can be directly connected to the ICE 38. In various implementations a first differential 54 is operatively connected to the transmission 46 and structured and operable to distribute torque received from transmission 46 to at least one of the rear wheels 30, via a rear axle 58. In various embodiments the drivetrain 34 can include a driveshaft (not shown) that operatively connects the ICE 38 and transmission 46 to the first differential 54. Although the ICE 38 is shown by way of example in FIG. 2 as providing torque to at least one of the rear wheels 32, it is envisioned that the ICE 38 can additionally or alternatively be operationally connected, via the transmission 46 to deliver torque to at least one of the front wheels 30. In various ICE implementations, the vehicle 10 further includes an engine throttle 60 that is structured and operable to control a fuel/air mixture supplied to the ICE 38 to increase and decrease the RPM of the ICE 38. More specifically, the engine throttle 60 is operationally connected to an accelerator pedal 62 disposed within the passenger compartment 26 such that the engine throttle 56 is responsive to position of an accelerator pedal 62, as controlled by a vehicle operator, to increase and decrease the RPM of the ICE 38 as desired, and thereby control the torque delivered by the ICE 38 to one or more of the front and/or rear wheels 30 and/or 34. It should be noted that, in addition to the RPM of the ICE, the torque delivered to one or more of the front and/or rear wheels 30 and/or 34 can further be effected and controlled by the operational configuration (e.g., the gear ratio) of the at least one of the transmission 46, and/or the first differential 54, and/or the second differential 64.

In various implementations wherein the vehicle 10 includes the electric motor 42, the vehicle 10 can additionally include a second differential 64 operatively connected to the electric motor 42 and structured and operable to receive torque (e.g., motive force) generated by the electric motor 42 and to distribute the torque to at least one of the front wheels 30, via a front axle 66. Although the electric motor 42 is shown by way of example in FIG. 2 as providing torque to at least one of the front wheels 30, it is envisioned that the electric motor can additionally or alternatively be operationally connected to deliver torque to at least one of the rear wheels 32. In various electric motor implementations, the vehicle 10 further includes a motor current and/or voltage controller 68 that is structured and operable to control the amount of current and/or voltage supplied to the motor 42 to increase and decrease the RPM of the motor 42. More specifically, the current/voltage controller 68 is operationally connected to the accelerator pedal 62 such that the current/voltage controller is responsive to position of an accelerator pedal 62, as controlled by a vehicle operator, to increase and decrease the RPM of the motor 42 as desired, and thereby control the torque delivered by the motor 42 to one or more of the front and/or rear wheels 30 and/or 32. It should be noted that, in addition to the RPM of the motor 42, the torque delivered to one or more of the front and/or rear wheels 30 and/or 34 can further be effected and controlled by the operational configuration (e.g., the gear ratio) of the at least one of the transmission 46, and/or the first differential 54, and/or the second differential 64. It will be appreciated, that the foregoing description of the drivetrain 34 is provided by way of example, and not by way of limitation, and other selection and arrangement of components can be substituted within the scope of the disclosure. For example, in some embodiments, a transaxle can be substituted for the transmission 46 and one of the differentials 54/64 and remain within the scope of the disclosure.

It is envisioned that various embodiments, the vehicle 10 can be configured as a 4-wheel drive vehicle, wherein at least one of the ICE 38 and/or the electric motor 42 is/are operatively connected to the first differential 54, and at least one of the ICE 38 and/or the electric motor 42 is/are operatively connected to the second differential 64 such that the ICE 38 and/or the electric motor 42 deliver torque to at least one front wheel 30 and at least one rear wheel 32. In such 4-wheel drive embodiments, the vehicle 10 can include a driveshaft 70 structured and operable to connect the ICE 38 and/or the electric motor 42 to the respective other first or second differential 54 or 64. As used herein, based on the particular configuration of the prime mover(s) 18 of the vehicle 10, that is, based on whether the vehicle 10 includes just the ICE 38, just the electric motor 42, or both the ICE 38 and the electric motor 42, and whether the vehicle 10 is configured as a 2-wheel drive vehicle or a 4-drive vehicle, the drivetrain 34 can comprise any or all of, individually or in any combination, the transmission 46, the first differential 54, the rear axle 58, the second differential 64, front axle 66, and the driveshaft 70.

The passenger compartment 26 generally includes: a dash console 72 that can include such things an On/Off key switch, a driver information display panel/screen, a forward/neutral/reverse selector, a 2-wheel drive/4-wheel drive selector, one or more small accessory storage pockets, a speedometer, various other gauges and/or instrumentation, a radio, and/or various other vehicle controls; a steering wheel 74 for use by the vehicle operator to control the directional movement of the vehicle 10; a brake pedal 76 for use by the vehicle operator to control slowing and stopping of the vehicle 10; the accelerator pedal 62 for use by the vehicle operator to control the torque delivered by one or more prime mover 18 to one or more of the front and/or rear wheels 30 and/or 32; a floorboard 78; and one or more passenger seating structure 80 for supporting one or more passengers of the vehicle 10 (e.g., a driver and one or more non-drivers). The seating structure 80 can be any suitable seating structure, for example, one or more row bench style seats or one or more rows of side-by-side seats.

As described above, the safety restraint prime mover RPM controller 14 is structured and operable to control (e.g., limit) the rotational speed (e.g., revolutions per minute (RPM)) of at least one vehicle prime mover 18 (e.g., an internal combustion engine (ICE) 38 and/or an electric motor 42) when one or more safety restraint device 22 (e.g., seat belts, side/door net, etc.) of the vehicle 10 is disengaged (e.g., disconnected or unbuckled) and the vehicle 10 is in an On operational status. More particularly, in various embodiments when one or more of safety restraint device 22 is disengaged, and the vehicle 10 is in the On operational status, the safety restraint prime mover RPM controller 14 will limit the RPM of the prime mover(s) 18 to a maximum threshold. In this regard, the RPM controller 14 can be configured to prevent the RPM of the prime mover(s) 18 from exceeding the maximum threshold, such that RPM of the prime mover(s) 18 can be confined within a range between 0 RPM and the maximum threshold. The maximum threshold can be any predetermined RPM value, for example, 2000, 3000, 4000, 5000 or 6000 RPM.

As used herein, the On operational status will be understood to mean that prime mover(s) 18, e.g., the ICE 38 and/or the electric motor 42, has/have been placed in an operational status. That is, the ICE 38 of the vehicle 10 has been started and is running and/or the electric motor 42 of the vehicle 10 has been activated, e.g., electrically connected to a power source such as a battery pack 96 of the vehicle 10. When in the On operational status, the vehicle 10 (e.g., the drivetrain 34) can be configured in a Forward Mode or a Reverse Mode, whereby torque will be provided to at least one wheel 30/32 when a vehicle operator actuates an accelerator pedal 62 of the vehicle, or configured in a Neutral Mode, whereby torque will not be provided to any of the wheels 30/32 if a vehicle operator actuates the accelerator pedal 62 of the vehicle.

The safety restraint device(s) 22 can comprise any suitable passenger safety restraint device, such as a seat belt or seat harness, a side or door net, a top or roof net, or any other device that is manually or automatically engageable/disengageable and is structured and operable to retain a respective vehicle passenger in a respective seating structure 80 and/or within the passenger compartment 26 if the vehicle 10 stops quickly, makes a sharp turn, traverses rough, bumpy and/or hilly terrain, or is otherwise operated such that, if not for the safety restraint device(s) 22, the passenger(s) may be displaced or ejected from the respective seating structure 80 and/or vehicle 10. It is envisioned that the vehicle 10 can include one or more different type of safety restraint device 22.

Although the safety restrain device(s) 22 can be any manually or automatically engageable/disengageable device of the vehicle 10 that is structured and operable to protect passengers from displacement and/or ejection from the seating structure 80 and/or the vehicle 10, as described above, for simplicity and conciseness, the safety device(s) 22 will be described herein, by way of example, as one or more seat belt or seat harness device structured and operable to retain a respective vehicle passenger in a respective seating structure 80 if the vehicle 10 stops quickly, makes a sharp turn, traverses rough, bumpy and/or hilly terrain, or is otherwise operated such that, if not for the safety restraint device(s) 22, the passenger(s) may be displaced or ejected from the respective seating structure 80. In such embodiments, the safety restraint device(s) 22 comprise(s) a lap belt 100 that is connected to a first connector 102A of a seatbelt latching device 102. In various instances, the safety restraint device(s) 22 can additionally include a torso belt 104 that is also connected to the first connector 102A of the latching device 102. A second connector 102B of the seatbelt latching device 102 is anchored to the seat structure 80 or other vehicle support structure. Therefore, when the lap belt 100 is extended across the lap of a vehicle passenger and/or the torso belt 104 is extended across the torso of a vehicle passenger, and the first and second connectors 102A and 102B of the latching device 102 are connected, interlocked, buckled, or otherwise secured to together, the respective vehicle passenger is retained within the respective seating structure 80.

Figure 3:
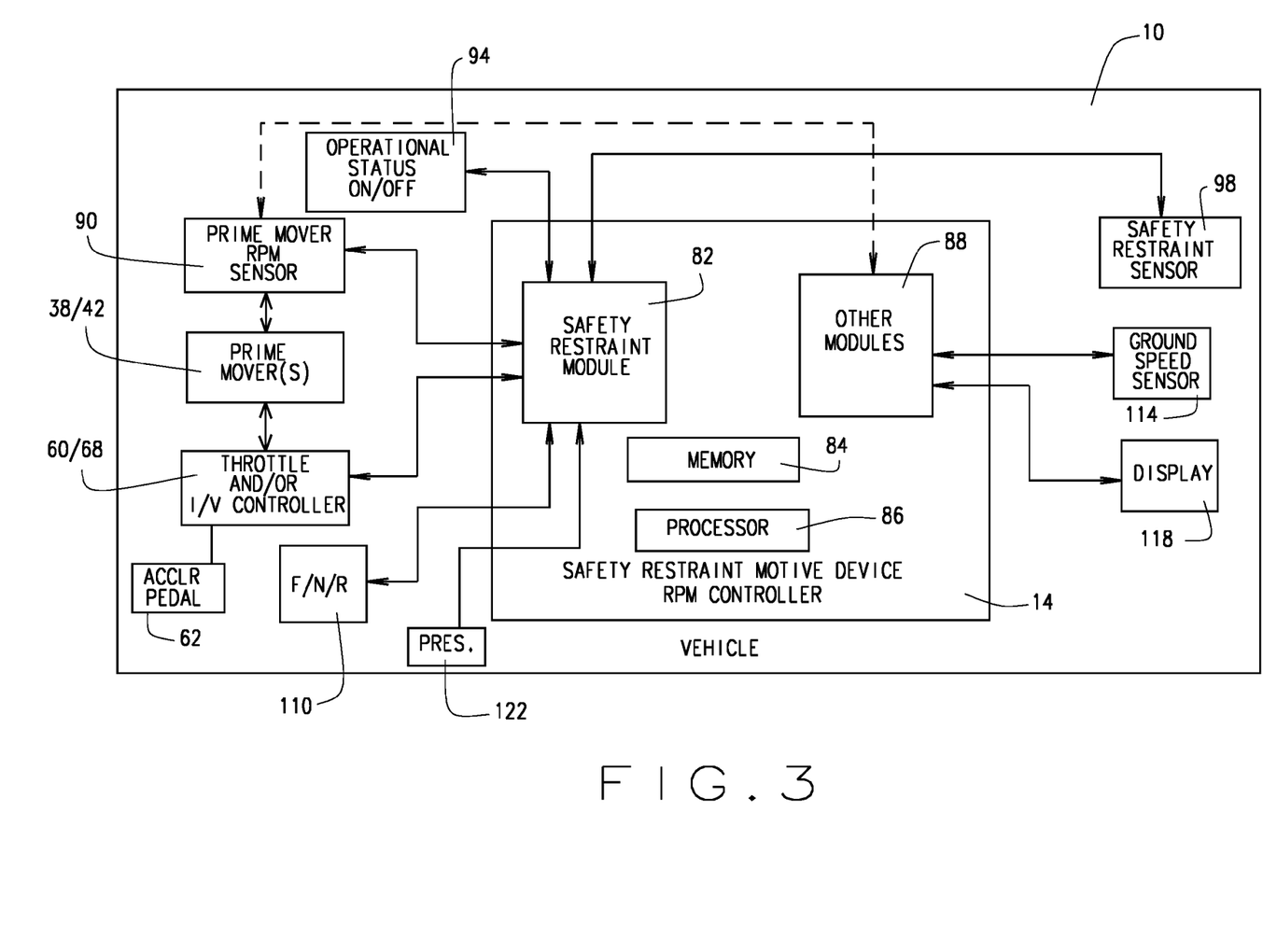
FIG. 3 is a block diagram of the vehicle and the safety restraint prime mover RPM limiting controller shown in FIG. 1, in accordance with various embodiments of the present disclosure.

Referring now to FIGS. 2 and 3, as described above, the RPM controller 14 will limit the rotational speed the vehicle prime mover(s) 18 to a maximum threshold when one or more safety restraint device 22 is disengaged and the vehicle 10 is in the On operational status (e.g., the ICE 38 is running and/or the electric motor 42 has been activated). It is envisioned that the RPM controller 14 can comprise one or more, or be part of, application specific integrated circuit(s) (e.g., ASIC(s)), combinational logic circuit(s); field programmable gate array(s) (FPGA); processor(s) (shared, dedicated, or group) that execute and implement safety restraint RPM limiting software; and/or other suitable hardware components that provide the functionality described herein; or a combination of some or all of the above, such as in a system-on-chip, and remain within the scope of the present disclosure.

In various embodiments, the RPM controller 14 comprises a safety restraint module 82 that is structured and operable to implement safety restraint actuated prime mover rotational speed (e.g., RPM) limiting command software functionality (referred to herein as safety restraint RPM limiting software), as described below. In various embodiments, the RPM controller 14 additionally includes at least one electronic memory device 84 and at least one processor 86. In various embodiments, the RPM controller 14 can further include one or more other module 88 that is/are structured and operable to implement routines to control various other different aspects of the vehicle 10. The electronic memory device(s) 84 comprise(s) a computer readable medium, e.g., non-transitory, tangible, computer-readable medium, such as a hard drive, erasable programmable read-only memory (EPROM), electronically erasable programmable read-only memory (EEPROM), read-write memory (RWM), etc. Other, non-limiting examples of the non-transitory, tangible, computer-readable medium are nonvolatile memory, magnetic storage, and optical storage. The processor(s) 86 is/are suitable to execute the various software, programs, algorithms, and/or code stored on the memory device 84, and the various software, programs, algorithms, and/or code implemented by and/or stored in the safety restraint module 82 and other module(s) 88, e.g., the safety restraint RPM limiting software.

It should be understood that, although the various safety restraint RPM limiting software control operations and functionality, and other software control operations and functionality, may be described herein as being implemented or carried out by safety restraint module 82, e.g., by the RPM controller 14, it will be appreciated that in some embodiments the RPM controller 14 may indirectly perform and/or control performance of such operations and functionality by generating commands and control signals that can cause other elements to carry out the control operations and functionality described herein. For example, in the various executable software embodiments, it is the execution of the safety restraint RPM limiting software by one or more processor 86 of the RPM controller 14 that can generate the seat belt actuated prime mover RPM limiting commands that are then output by the RPM controller 14 to implement the safety restraint RPM limiting software operations and functions as described herein. Or, in the various hardware embodiments, it is the operation of the various RPM controller 14 hardware components that can generate the seat belt actuated prime mover RPM limiting commands that are then output by the RPM controller 14 to implement the safety restraint RPM limiting software operations and functions as described herein.

As described above, the accelerator pedal 62 is operatively connected to the engine throttle 60 and/or the current/voltage controller 68, depending on whether the prime mover(s) 18 comprise(s) the ICE 38 and/or the motor 42. Additionally, the engine throttle 60 and/or the current/voltage controller 68 are in data communication with the RPM controller 14, and specifically with the safety restraint module 82 thereof. The RPM controller 14, and particularly the safety restraint module 82, is further in data communication with one or more prime mover speed sensor(s) 90 of the vehicle 10. The speed sensor(s) 90 is/are structured and operable to monitor and communicate to the safety restraint module 82 the rotational speed (e.g., RPM) of the prime mover(s) 18 (e.g., the RPM of the ICE 38 and/or the electric motor 42) during operation of the vehicle 10. In various embodiments, the prime mover speed sensor(s) 90 can further provide data to the other modules 88 to control other operations of the vehicle 10.

Furthermore, the RPM controller 14, and particularly the safety restraint module 82, is in data communication with a vehicle operational status sensor, switch or device 94 (e.g., an ignition switch, an On/Off switch, etc.) of the vehicle 10. The vehicle operational status sensor, switch or device 94 is structured and operable to monitor and communicate to the safety restraint module 82 the operational status of the vehicle 10. In the On operational status, wherein an ICE ignition switch has been activated and/or an electric motor On/Off switch is set to the On position, the ICE 38 has been started and is running and/or the electric motor 42 has been activated (e.g., the motor 42 has been electrically connected to the a battery pack 96 of the vehicle) such that the ICE 38 and/or electric motor 42 will provide motive force to the vehicle in response to operation of the accelerator pedal 62. In an Off operational status, wherein the ICE ignition switch has been deactivated and/or the electric motor On/Off switch is set to the Off position, the ICE 38 has not been started and is not running and/or the electric motor 42 is deactivated (e.g., the motor 42 is electrically disconnected from the battery pack 96) such that the ICE 38 and/or electric motor 42 will not provide motive force to the vehicle in response to operation of the accelerator pedal 62.

Still further, the RPM controller 14, and particularly the safety restraint module 82, is in data communication with at least one safety restraint sensor (e.g., at least one seatbelt sensor) 98 of the vehicle 10. The safety restraint sensor(s) 98 is/are structured and operable to monitor and communicate to the safety restraint module 82 an engagement status of a respective safety restraint device 22 of the vehicle 10. For example, in the various embodiments, wherein the safety restraint device is a seat belt or seat harness, the safety restraint sensor(s) 98 is/are structured and operable to monitor and communicate to the safety restraint module 82 whether the first and second connectors 102A and 102B of the respective safety restraint latching device 102 are engaged (e.g., connected, interlocked, buckled, or otherwise secured to together) or disengaged (e.g., disconnected, not interlocked, unbuckled, or otherwise not secured to together). In various implementations, the safety restraint sensor(s) 98 can be structured and operable to communicate with the safety restraint module 82 only when the first and second connectors 102A and 102B of the respective safety restraint latching device 102 are disengaged.

In various embodiments, the RPM controller 14, and particularly the safety restraint module 82, can further be in data communication with a Forward/Neutral/Reverse (F/N/R) controller 110 of the vehicle 10. The F/N/R controller 110 is structured and operable to selectively place the drivetrain 34 of the vehicle 10 in a Forward Mode, a Neutral Mode, or a Reverse Mode. When in the Forward Mode the vehicle drivetrain 34 is configured to provide a motive force to propel the vehicle 10 in a forward direction. When in the Neutral Mode the vehicle drivetrain 34 is configured to provide no motive force to the vehicle 10. When in the Reverse Mode the vehicle drivetrain 34 is configured to provide a motive force to propel the vehicle 10 in a reverse direction. The F/N/R controller 110 is additionally structured and operable to communicate to the safety restraint module 82 the position or setting of the F/N/R switch 110, that is, in which of the Forward Mode, the Neutral Mode, and the Reverse Mode the drivetrain 34 has been configured.

In various embodiments, the vehicle 10 can include a ground speed sensor 114 and a driver information display panel/screen 118 (which can be disposed in the dash console, as described above). The ground speed sensor 114 is structured and operable to determine and monitor the ground speed of the vehicle 10. It should be noted that, in various example embodiments, such as that illustrated in FIG. 3, the ground speed sensor 114 is not in data communication with the safety restraint module 82. Rather, the ground speed sensor 114 can be in data communication with the one or more other vehicle module 88. In various embodiments, the ground speed sensor 114 can communicate data representative of the ground speed of the vehicle 10 to one or more of the other modules 88, whereby the one or more other modules 88 can translate the ground speed data and display the ground speed on the driver information display panel/screen 118 to be viewed by the vehicle operator. Importantly, in various example embodiments, such as that illustrated in FIG. 3, data from the ground speed sensor 114 is not communicated to the safety restraint module 82 of the RPM controller 14, and more particularly is not utilized during execution of the safety restraint RPM limiting software to control (e.g., limit) the RPM of the prime mover(s) when one or more of the safety restraints is disengaged.

Figure 4:
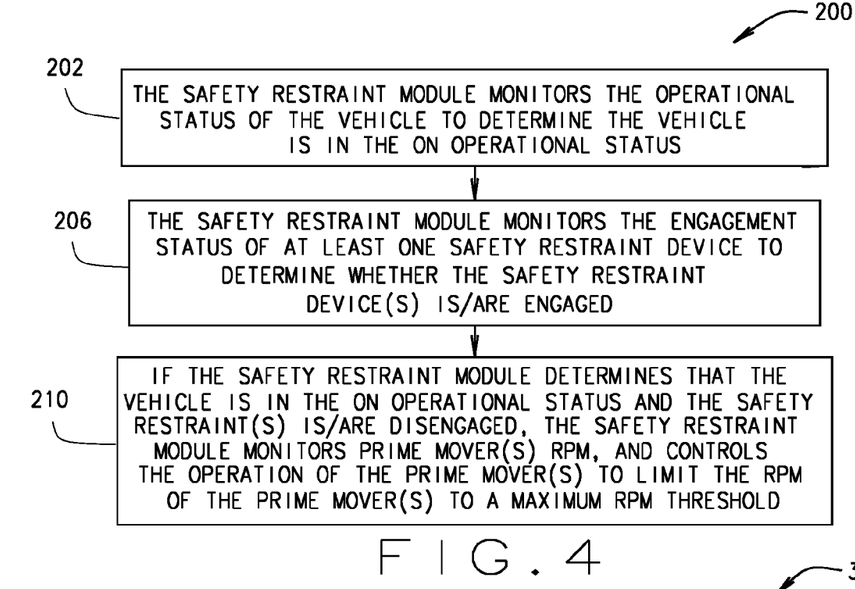
FIG. 4 is a flow chart illustrating implementation of prime mover RPM control by a safety restraint module of the safety restraint prime mover RPM limiting controller, in accordance with various embodiments of the present disclosure.

Referring now to FIGS. 3 and 4, FIG. 4 provides a flow chart 200 illustrating a method of prime mover RPM control implemented by the safety restraint module 82, in accordance with an example embodiment. It is envisioned that implementation of the prime mover RPM control by the safety restraint module 82 can be achieved via execution of the safety restraint RPM limiting software, by hardware, or a combination of software and hardware. In the example embodiment of FIG. 4, the safety restraint module 82 communicates with (e.g., receives inputs from) the operational status sensor, switch or device 94 to monitor the operational status of the vehicle 10 to determine whether the vehicle 10 is in the On operational status (e.g., the ICE 38 has been started and/or the electric motor 42 has been activated), as illustrated at 202. Additionally, the safety restraint module 82 communicates with (e.g., receives inputs from) the safety restraint sensor(s) 98 (e.g., seat belt sensor(s) 98) to monitor the engagement status of at least one safety restraint device 22 (e.g., the engagement status of at least the driver's side safety restraint device 22) to determine whether the safety restraint device(s) 22 is/are engaged, as illustrated at 206. As described above, in various embodiments, the safety restraint module 82 can receive inputs from and monitor the engagement status of only one safety restraint device 22 (e.g., a driver's safety restraint device 22), or the safety restraint module 82 can receive inputs from and monitor the engagement status of a plurality of safety restraint devices 22 (e.g., a driver's safety restraint device 22, and the safety restraint device(s) 22 of one or more passenger/non-driver).

If the safety restraint module 82 determines that the vehicle 10 is in the On operational status and the safety restraint device(s) 22 is/are disengaged, the safety restraint module 82 monitors the RPM of the prime mover(s) 18 via communication with (e.g., receives inputs from) the prime mover speed sensor 90, and outputs commands to control the operation of the prime mover(s) 18 (e.g., the ICE 38 and/or the electric motor 68) so that the rotational speed (RPM) of the prime mover(s) 18 does not exceed a predetermined maximum RPM threshold (e.g., 2000, 3000, 4000, 5000 or 6000 RPM), as illustrated at 210. For example, in various embodiments the maximum RPM threshold can be set to 4000 RPM.

It will be understood that if any of the conditions monitored by the safety restraint module 82 during the operations indicated at 202 or 206 do not occur (e.g., the vehicle 10 is in an Off operational status, and/or the safety restraint device(s) 22 are engaged), in various embodiments, the safety restraint module 82 of such embodiments will not implement prime mover RPM control and will loop back to the operation indicated at 202 and repeat the subsequent operations, as described above.

Although the implementation of the prime mover RPM control by the safety restraint module 82 has been described with regard to flow chart 200 such that the safety restraint module 82 determines the operational status of the vehicle 10 (operation 202), then determines the engagement status of the safety restraint device(s) 22 (operation 206), implementation by the safety restraint module 82 is not limited to this order of operations. It is envisioned that the operations 202 and 206, and any other operations described herein that are carried out by the safety restraint module 82, can be performed in any order.

In various embodiments the maximum RPM threshold is programmable such that the maximum RPM threshold can be set to any desired value and is changeable by a vehicle operator via any suitable RPM controller programming device, e.g., using the display 118 and programming stored in the memory device 84, wired or wireless connection to a handheld programmer such as a table or smart phone). Additionally, in various instances, access or allowability for programming the maximum RPM threshold can be limited or protected through password security or other security method.

In various embodiments, to limit the RPM of the ICE 38 when the safety restraint device(s) 22 are disengaged and the vehicle 10 is in the On operational status, the safety restraint module 82 overrides inputs from the accelerator pedal 62 to the engine throttle 60 and controls the engine throttle 60 so that the RPM of ICE 38 will not exceed the maximum RPM threshold. Similarly, when the safety restraint device(s) 22 are disengaged and the vehicle 10 is in the On operational status, the safety restraint module 82 overrides inputs from the accelerator pedal 62 to motor current/voltage controller 68 and controls the motor current/voltage controller 68 so that the RPM of electric motor 42 will not exceed the maximum RPM threshold.

In the embodiments wherein the vehicle 10 includes both the ICE 38 and the electric motor 42, the safety restraint module 82 overrides inputs from the accelerator pedal 62 to both engine throttle 60 and the motor current/voltage controller 68 and controls both engine throttle 60 and the motor current/voltage controller 68 so that the RPM of both the ICE 38 and the electric motor 42 will not exceed the maximum RPM threshold. It is envisioned that the maximum RPM threshold for ICE 38 and the maximum RPM threshold for the electric motor 42 can be the same value or different values.

By way of example, to illustrate operation of the safety restraint module 82, in an example scenario the vehicle 10 is initially in the Off operational status, wherein the prime mover(s) 18 are not configured to output torque (e.g., the ICE 38 is not running and/or the electric motor 42 deactivated). Subsequently, an operator can place the vehicle in the On operational status by starting the ICE 38 and/or activating the electric motor 42. Upon placing the vehicle in the On operational status, the safety restraint module 82 begins to monitor the RPM of the prime mover(s) via communication with the prime mover speed sensor 90, and communicates with the safety restraint sensor(s) 98 to determine if the safety restraint device(s) 22 are engaged. If the safety restraint device(s) 22 is/are disengaged, the safety restraint module 82 will limit the RPM of the prime mover(s) 18 to the maximum RPM threshold. For example, the safety restraint module 82 will monitor the RPM of the ICE 38 and/or the electric motor 42, and control operation of the engine throttle 60 and/or the motor current/voltage controller 68 to limit any commanded/requested increase in RPM of the ICE 38 and/or electric motor 42 to the respective maximum RPM threshold. Hence, although the vehicle 10 can be driven (e.g., operated to deliver torque to at least one of the wheels 30/32), the safety restraint module 82 will not allow the RPM of the prime mover 18 to exceed the maximum RPM threshold, regardless of commands from the accelerator pedal 62 to exceed the maximum RPM threshold. If the safety restraint device(s) 22 is/are engaged, the safety restraint module 82 will monitor the RPM of the prime mover(s) 18 via communication with the prime mover speed sensor 90 and allow normal operation of the prime mover(s) 18.

By way of another example, to illustrate operation of the safety restraint module 82, in another example scenario the vehicle 10 is moving under the control of a vehicle driver, the safety restraint device(s) 22 is/are engaged, the safety restraint module 82 is monitoring the RPM of the prime mover(s) via communication with the prime mover speed sensor 90, and the prime mover(s) 18 is/are operating at an RPM that is greater than the maximum RPM threshold. Subsequently, if the safety restraint device(s) 22 is/are disengaged, the safety restraint module 82 will immediately override the commands from the accelerator pedal 62 and lower the RPM of the prime mover(s) to the maximum RPM threshold. For example, the safety restraint module 82 will monitor the RPM of the ICE 38 and/or the electric motor 42, and control operation of the engine throttle 60 and/or the motor current/voltage controller 68 to reduce the RPM of the ICE 38 and/or electric motor 42 to the respective maximum RPM threshold. If the safety restraint device(s) 22 is/are subsequently reengaged, the safety restraint module 82 will monitor the RPM of the prime mover(s) 18 and allow normal operation of the prime mover(s) 18.

By way of yet another example, to illustrate operation of the safety restraint module 82, in yet another example scenario the vehicle 10 is moving under the control of a vehicle driver, the safety restraint device(s) 22 is/are engaged, the safety restraint module 82 is monitoring the RPM of the prime mover(s) via communication with the prime mover speed sensor 90, and the prime mover(s) 18 is/are operating at an RPM that is less than the maximum RPM threshold. Subsequently, if the safety restraint device(s) 22 is/are disengaged, the safety restraint module 82 will limit any commanded increase in RPM to the maximum RPM threshold. That is, the prime mover(s) 18 RPM can be increased up to the maximum RPM threshold, but any commands from the accelerator pedal 62 to increase the RPM over the maximum RPM threshold will be overridden by the safety restraint module 82 and the prime mover(s) RPM will not be allowed to exceed the maximum RPM threshold. For example, the safety restraint module 82 will monitor the RPM of the ICE 38 and/or the electric motor 42, and control operation of the engine throttle 60 and/or the motor current/voltage controller 68 to limit any commanded increase in the RPM of the ICE 38 and/or electric motor 42 to the respective maximum RPM threshold. If the safety restraint device(s) 22 is/are subsequently reengaged, the safety restraint module 82 will monitor the RPM of the prime mover(s) 18 and allow normal operation of the prime mover(s) 18.

It is described above that in various embodiments, the safety restraint module 82 can control (e.g., limit) the RPM of the ICE 38 by controlling the operation of the engine throttle 60. As described above, the engine throttle 60 controls the supply of air and/or fuel to ICE 38. In various other embodiments, the safety restraint module 82 can control (e.g., limit) the RPM of the ICE 38 by controlling the ignition timing of the ICE 38 via communication with an engine ignition distributor (not shown) or an engine electronic ignition device (not shown). In yet other various embodiments, the safety restraint module 82 can control (e.g., limit) the RPM of the ICE 38 by controlling both the engine throttle 60 and the ignition timing of the ICE 38 (e.g., controlling the engine ignition distributor or the engine electronic ignition device.

Figure 5:
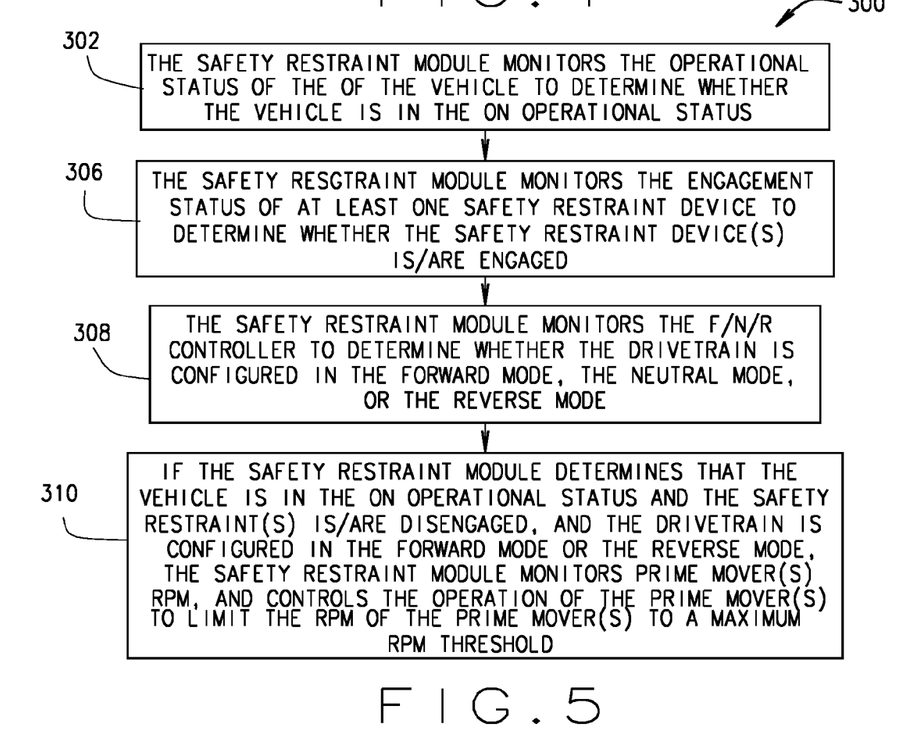
FIG. 5 is a flow chart illustrating implementation of prime mover RPM control by the safety restraint module of the safety restraint prime mover RPM limiting controller, in accordance with various other embodiments of the present disclosure.

Referring now to FIGS. 3 and 5, FIG. 5 provides a flow chart 300 illustrating a method of prime mover RPM control implemented by the safety restraint module 82, in accordance with another example embodiment. It is envisioned that implementation of the prime mover RPM control by the safety restraint module 82 can be achieved via execution of the safety restraint RPM limiting software, by hardware, or a combination of software and hardware. In various embodiments, in addition to the operations described above with regard to flow chart 200, the safety restraint module 82 can communicate with (e.g., receive inputs from) the F/N/R controller 110 to monitor and determine when to limit the RPM of the prime mover(s) 18 to the maximum RPM threshold.

That is, in various embodiments, if the safety restraint module 82 determines that the vehicle 10 is in the On operational status, as illustrated at 302, and the safety restraint device(s) 22 is/are disengaged, as illustrated at 306, the safety restraint module 82 can then communicate with the F/N/R controller 110 to determine whether the drivetrain 34 is configured in the Forward Mode, the Neutral Mode, or the Reverse Mode, as illustrated at 308. In various implementations of such embodiments, if the safety restraint module 82 determines that the vehicle 10 is in the On operational status, the safety restraint device(s) 22 is/are disengaged, and the drivetrain 34 is configured in one of the Forward Mode or the Reverse Mode, the safety restraint module 82 will monitor the RPM of the prime mover(s) 18 and output commands to control the operation of the prime mover(s) 18 to limit the RPM of the prime mover(s) 18 to the maximum RPM threshold, as illustrated at 310.

It will be understood that if any of the conditions monitored by the safety restraint module 82 during the operations indicated at 302, 306 or 308 do not occur (e.g., the vehicle 10 is in an Off operational status, and/or the safety restraint device(s) 22 are engaged, and/or the F/N/R controller is not set to the Forward or Reverse Mode), in various embodiments, the safety restraint module 82 of such embodiments will not implement prime mover RPM control, and will loop back to the operation indicated at 302 and repeat the subsequent operations, as described above.

Although the implementation of the prime mover RPM control by the safety restraint module 82 has been described with regard to flow chart 300 such that the safety restraint module 82 determines the operational status of the vehicle 10 (operation 302), then determines the engagement status of the safety restraint device(s) 22 (operation 306), then determines whether the drivetrain 34 is configured in the Forward, Neutral or Reverse Mode (operation 308), implementation by the safety restraint module 82 is not limited to this order of operations. It is envisioned that the operations 302, 306 and 308, and any other operations described herein that are carried out by the safety restraint module 82, can be performed in any order.

Figure 6:
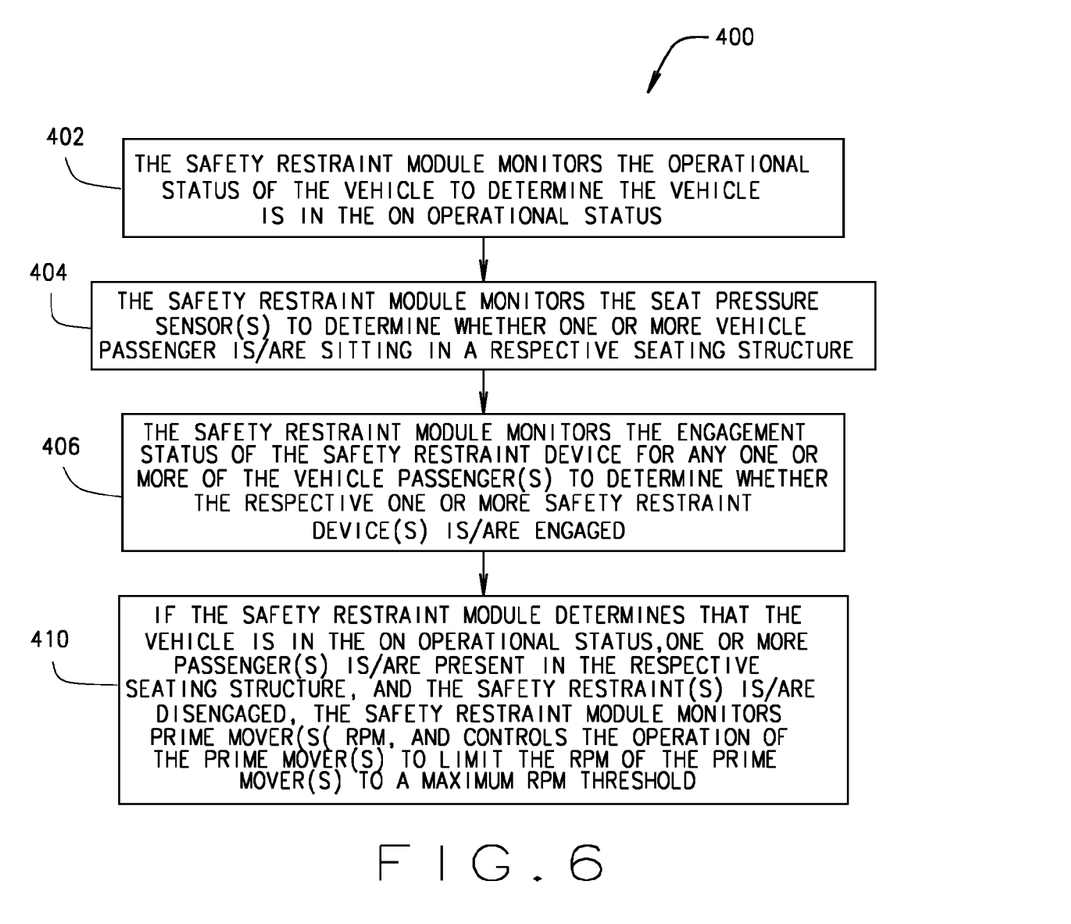
FIG. 6 is a flow chart illustrating implementation of prime mover RPM control by the safety restraint module of the safety restraint prime mover RPM limiting controller, in accordance with yet other various embodiments of the present disclosure.

Referring now to FIGS. 3 and 6, FIG. 6 provides a flow chart 400 illustrating a method of prime mover RPM control implemented by the safety restraint module 82, in accordance with yet another example embodiment. It is envisioned that implementation of the prime mover RPM control by the safety restraint module 82 can be achieved via execution of the safety restraint RPM limiting software, by hardware, or a combination of software and hardware. In various embodiments, the RPM controller 14, and particularly the safety restraint module 82, can additionally be in data communication with one or more seat pressure sensor 122 of the vehicle 10. The seat pressure sensor(s) 122 is/are disposed within the one or more seating structure 80 and is structured and operable to sense when a respective vehicle passenger (e.g., a vehicle driver and/or other vehicle occupant) is present (e.g. sitting) in the respective seating structure 80. In such embodiments, in addition to the operations described above with regard to flow chart 200, the safety restraint module 82 can communicate with (e.g., receive inputs from) the seat pressure sensor(s) 122 to monitor and determine whether one or more vehicle passenger (e.g., a vehicle driver and/or other vehicle occupant) is/are present in a respective seating structure 80.

That is, in various embodiments, if the safety restraint module 82 determines that the vehicle 10 is in the On operational status, as illustrated at 402, the safety restraint module 82 can then communicate with the seat pressure sensor(s) 122 to determine whether one or more vehicle passenger (e.g., a vehicle driver and/or other vehicle occupant) is/are present in a respective seating structure 80, as illustrated at 404. If the seat pressure sensor(s) 122 indicate(s) that one or more vehicle passenger is/are present in the respective seating structure 80, the safety restraint module 82 monitors the engagement status of the safety restraint device 22 for any one or more of the vehicle passenger(s) to determine whether the respective one or more safety restraint device(s) 22 is/are engaged, as illustrated at 406. In various implementations of such embodiments, if the safety restraint module 82 determines that the vehicle 10 is in the On operational status, one or more passenger(s) is/are present in the respective seating structure 80, and the safety restraint device(s) 22 of the any one or more of the vehicle passenger(s) is/are disengaged, the safety restraint module 82 will monitor the RPM of the prime mover(s) 18 and output commands to control the operation of the prime mover(s) 18 to limit the RPM of the prime mover(s) 18 to the maximum RPM threshold, as illustrated at 410.

It will be understood that if any of the conditions monitored by the safety restraint module 82 during the operations indicated at 402, 406 or 408 do not occur (e.g., the vehicle 10 is in an Off operational status, and/or the seat pressure sensor(s) 122 indicate that one or more passenger is/are not present, and/or the safety restraint device(s) 22 are engaged), in various embodiments, the safety restraint module 82 of such embodiments will not implement prime mover RPM control, and will loop back to the operation indicated at 402 and repeat the subsequent operations, as described above.

Although the implementation of the prime mover RPM control by the safety restraint module 82 has been described with regard to flow chart 400 such that the safety restraint module 82 determines the operational status of the vehicle 10 (operation 402), then determines if one or more passenger is present in the respective seating structure 80 (operation 404), then determines the engagement status of the respective one or more safety restraint device(s) 22 (operation 406), implementation by the safety restraint module 82 is not limited to this order of operations. It is envisioned that the operations 402, 404 and 406, and any other operations described herein that are carried out by the safety restraint module 82, can be performed in any order.

Figure 7:
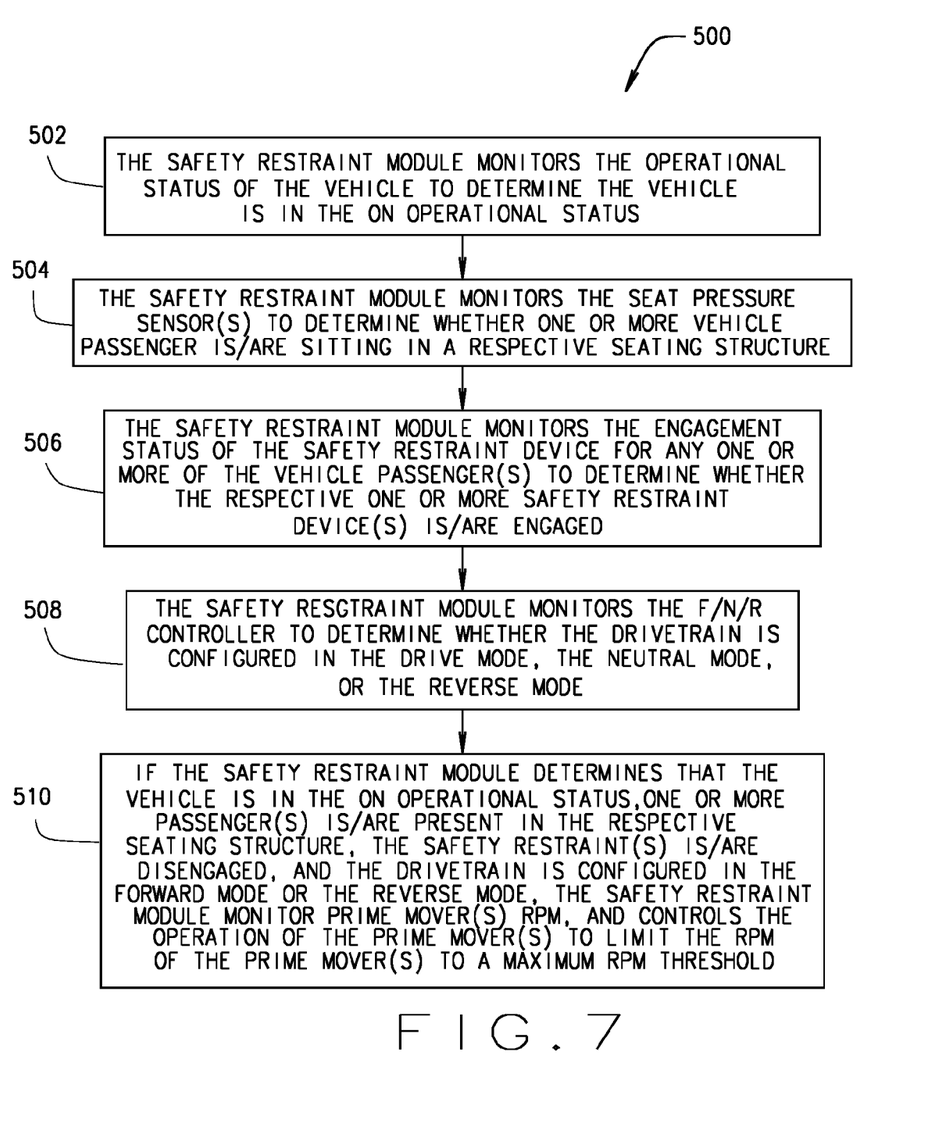
FIG. 7 is a flow chart illustrating implementation of prime mover RPM control by the safety restraint module of the safety restraint prime mover RPM limiting controller, in accordance with still yet other various embodiments of the present disclosure.

Referring now to FIGS. 3 and 7, FIG. 7 provides a flow chart 500 illustrating a method of prime mover RPM control implemented by the safety restraint module 82, in accordance with still yet another example embodiment. It is envisioned that implementation of the prime mover RPM control by the safety restraint module 82 can be achieved via execution of the safety restraint RPM limiting software, by hardware, or a combination of software and hardware. In various embodiments, the safety restraint module 82 can monitor each of the vehicle operational status sensor, switch or device 94, the seat pressure sensor(s) 122, the safety restraint sensor(s) 98 and the F/N/R controller 110. For example, in such embodiments, the safety restraint module 82 communicates with the operational status sensor, switch or device 94 to determine whether the vehicle 10 is in the On operational status, as illustrated at 502. Then, if the safety restraint module 82 determines that the vehicle 10 is in the On operational status, the safety restraint module 82 communicates with the seat pressure sensor(s) 122 to determine whether one or more vehicle passenger (e.g., a vehicle driver and/or other vehicle occupant) is/are present (e.g., sitting) in a respective seating structure 80, as illustrated at 504. Then, if the seat pressure sensor(s) 122 indicate that one or more vehicle passenger is/are present in the respective seating structure 80, the safety restraint module 82 communicates with the safety restraint sensor(s) 98 to monitor the engagement status of the safety restraint device 22 for any one or more of the vehicle passenger(s) and determine whether the respective one or more safety restraint device(s) 22 is/are engaged, as illustrated at 506. Then, the safety restraint module 82 can further communicate with the F/N/R controller 110 to determine whether the drivetrain 34 is configured in the Forward Mode, the Neutral Mode, or the Reverse Mode, as illustrated at 508.

In various implementations of such embodiments, if the safety restraint module 82 determines that the vehicle 10 is in the On operational status, one or more passenger is/are present in the respective seating structure 80, and the safety restraint device(s) 22 of the any one or more of the vehicle passenger(s) is/are disengaged, and the drivetrain 34 is configured in one of the Forward Mode or the Reverse Mode, the safety restraint module 82 will monitor the RPM of the prime mover(s) 18 and output commands to control the operation of the prime mover(s) 18 to limit the RPM of the prime mover(s) 18 to the maximum RPM threshold, as illustrated at 510.

It will be understood that if any of the conditions monitored by the safety restraint module 82 during the operations indicated at 502, 504, 506 or 508 do not occur (e.g., the vehicle 10 is in an Off operational status, and/or the seat pressure sensor(s) 122 indicate that one or more passenger is/are not present, and/or the safety restraint device(s) 22 are engaged, and or F/N/R controller is not set to the Forward or Reverse Mode), in various embodiments, the safety restraint module 82 of such embodiments will not implement prime mover RPM control, and will loop back to the operation indicated at 502 and repeat the subsequent operations, as described above.

Although the implementation of the prime mover RPM control by the safety restraint module 82 has been described with regard to flow chart 500 such that the safety restraint module 82 determines the operational status of the vehicle 10 (operation 502), then determines if one or more passenger is present in the respective seating structure 80 (operation 504), then determines the engagement status of the respective one or more safety restraint device(s) 22 (operation 506), then determines whether the drivetrain 34 is configured in the Forward, Neutral or Reverse Mode (operation 508), implementation by the safety restraint module 82 is not limited to this order of operations. It is envisioned that the operations 502, 504, 506 and 508, and any other operations described herein that are carried out by the safety restraint module 82, can performed in any order.

Although the operation of the safety restraint module 82 has been described above to control the RPM of the prime mover(s) 18 such that the prime mover(s) 18 do not exceed the predetermined maximum RPM threshold (e.g., 2000, 3000, 4000, 5000 or 6000 RPM) when it is determined that the vehicle 10 is in the On operational status and the safety restraint device(s) 22 is/are disengaged, it is envisioned that in various instances, when the safety restraint module 82 initially makes the determination to control the prime mover(s) 18 RPM to be at or below the maximum threshold, the RPM of the prime mover(s) 18 can initially briefly/transiently exceed the maximum threshold and then be reduced and maintained at or below the maximum threshold.

It is envisioned that in various embodiments, the safety restraint module 82 can be in data communication with the driver information display panel/screen 118, and cause and audible to sound and/or visual warning to be displayed on the driver information display panel/screen 118 whenever the safety restraint device(s) 22 is/are disengaged and the safety restraint module 82 limiting the RPM of the prime mover(s) 18 to the maximum RPM threshold.

As described above, in various embodiments, the vehicle 10 can include ground speed sensor 114, which can be in data communication with at least one of the other modules 88 of the RPM controller 14. As also described above, the ground speed sensor 114 is structured and operable to provide a signal indicative of the ground speed of the vehicle 10 to one or more of the other modules 88, which in-turn cause the ground speed of the vehicle 10 to be displayed on driver information display panel/screen 118 for viewing by the vehicle operator. Importantly, in various embodiments, such as that illustrated in FIG. 3, data from the ground speed sensor 114 is not communicated to the safety restraint module 82 of the RPM controller 14, and more particularly is not utilized during to control (e.g., limit) the RPM of the prime mover(s) 18 when one or more of the safety restraints 22 is disengage. While the data representative of the ground speed can be provided as an input to one or more of the other modules 88, neither this data nor the ground speed of the vehicle 10 is received by or used by the safety restraint module 82 to control (e.g., limit) the RPM of the prime mover(s) (e.g., the ICE 38 and/or the electric motor 42) as described above.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A method for controlling the operation of a vehicle prime mover based on the engagement status of one or more safety restraints of the vehicle, said method comprising:

monitoring, via a RPM controller of the vehicle, an operational status of the vehicle;

monitoring, via the RPM controller, an engagement status of at least one passenger safety restraint of the vehicle; and limiting, via the RPM controller, a rotational speed of one or more prime mover of the vehicle to a maximum threshold when the vehicle is in an On operational status and the at least one safety restraint is in a disengaged status, wherein limiting the rotational speed of the one or more prime mover to the maximum threshold comprises controlling, via the RPM controller, operation of a throttle of at least one of the one or more prime mover, and wherein controlling the operation of the throttle of the at least one of the one or more prime mover, comprises overriding, via the RPM controller, a throttle command received from an accelerator pedal of the vehicle so that the rotational speed of the one or more prime mover does not exceed the maximum threshold regardless of the throttle command received from an accelerator pedal.

2. The method of claim 1 further comprising monitoring, via the RPM controller, the rotational speed of the one or more prime mover when the vehicle is in the On operational status.

3. The method of claim 2, wherein limiting the rotational speed of the one or more prime mover to a maximum threshold comprises controlling, via the RPM controller, an ignition timing of at least one of the one or more prime mover.

4. The method of claim 2, wherein limiting the rotational speed of the one or more prime mover to a maximum threshold comprises controlling, via the RPM controller, one or more of a voltage and a current supplied to at least one of the one or more prime mover.

5. The method of claim 4, wherein controlling the one or more of a voltage and a current supplied to at least one of the one or more prime mover, comprises overriding, via the RPM controller, a throttle command received from an accelerator pedal of the vehicle so that the rotational speed of the one or more prime mover does not exceed the maximum threshold regardless of the throttle command received from an accelerator pedal.

6. A method for controlling the operation of a vehicle prime mover based on the engagement status of one or more safety restraints of the vehicle, said method comprising:

monitoring, via a RPM controller of the vehicle, an operational status of the vehicle;

monitoring, via the RPM controller, an engagement status of at least one passenger safety restraint of the vehicle;

monitoring, via the RPM controller, a presence of a vehicle passenger in a seating structure of the vehicle, and limiting, via the RPM controller, a rotational speed of one or more prime mover of the vehicle when the vehicle is in an On operational status, the at least one safety restraint is in a disengaged status, and at least one passenger is present in the seating structure.

7. An off-road utility vehicle, said vehicle comprising:

a pair of front wheels and a pair of rear wheels operationally connected to a chassis of the vehicle;

a passenger compartment supported by the chassis, the passenger compartment comprising:
  a vehicle operational status switch structured and operable to control the operational status of the vehicle;
  at least one seating structure structured and operable to support one or more vehicle passenger; and
  at least one safety restraint device, each safety restraint device structured and operable to retain a respective vehicle passenger in a respective seating structure;

a drivetrain operationally connected to at least one of the wheels, the drivetrain comprising one or more prime mover structured and operable to generate torque deliverable to the at least one of the wheels; and a prime mover RPM controller, the prime mover RPM controller structured and operable to:
  receive input from the vehicle operational status switch of the vehicle to monitor an operational status of the vehicle;
  receive input from at least one safety restraint sensor of the vehicle to monitor an engagement status of the at least one passenger safety restraint; and
  output commands to one or more prime mover to limit a rotational speed of the one or more prime mover of the vehicle to a maximum threshold when the vehicle is in an On operational status and the at least one safety restraint is in a disengaged status.

8. The vehicle of claim 7, wherein the prime mover RPM controller is further structured and operable to output commands to a throttle of at least one of the one or more prime mover to limit the rotational speed of the respective prime mover to the maximum threshold.

9. The vehicle of claim 8, wherein the prime mover RPM controller is further structured and operable to override a throttle command received from an accelerator pedal of the vehicle so that the rotational speed of the one or more prime mover does not exceed the maximum threshold regardless of the throttle command received from an accelerator pedal.

10. The vehicle of claim 7, wherein the prime mover RPM controller is further structured and operable to output commands to a device structured and operable to control at least one of a current and a voltage supplied to at least one of the one or more prime mover to limit the rotational speed of the respective prime mover to the maximum threshold.

11. The vehicle of claim 10, wherein the prime mover RPM controller is further structured and operable to override a throttle command received from an accelerator pedal of the vehicle so that the rotational speed of the one or more prime mover does not exceed the maximum threshold regardless of the throttle command received from an accelerator pedal.

12. The vehicle of claim 7, wherein the prime mover RPM controller is further structured and operable to output commands to control an ignition timing of at least one of the one or more prime mover to limit the rotational speed of the respective prime mover to the maximum threshold.

13. The vehicle of claim 7, wherein the prime mover RPM controller is further structured and operable to monitor a presence of a vehicle passenger in a seating structure of the vehicle, and to limit the rotational speed of the one or more prime mover of the vehicle by limiting the rotational speed of the one or more prime mover of the vehicle when at least one passenger is present in the seating structure.

* * * * *